March 11, 1924.
J. B. ANDERSON
AUTOMATIC VALVE
Filed April 12, 1923
1,486,116
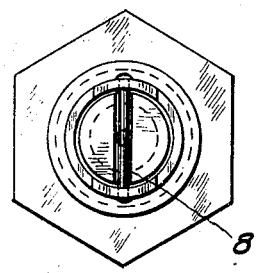
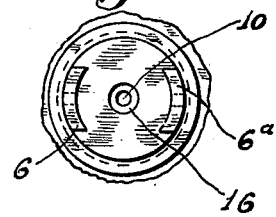
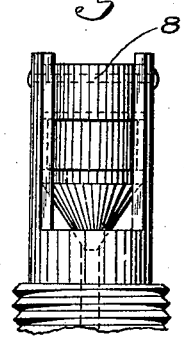
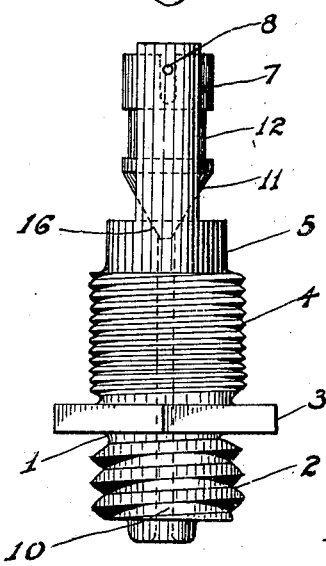
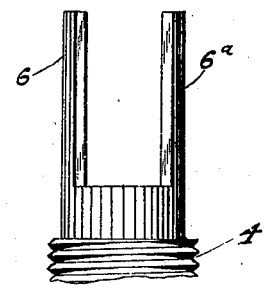
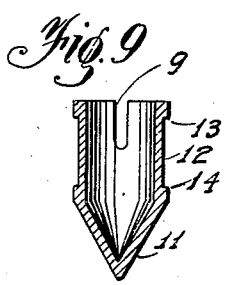
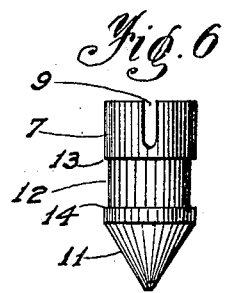
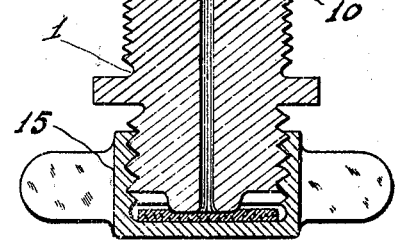
INVENTOR.
James B. Anderson
by Ralph Donath
and
Paul Purchard
Attorneys Patented Mar. 11, 1924.

1,486,116

UNITED STATES PATENT OFFICE.

JAMES B. ANDERSON, OF PITTSBURGH, PENNSYLVANIA, ASSIGNOR TO PUMPLESS BLOW TORCH COMPANY, OF PITTSBURGH, PENNSYLVANIA.

AUTOMATIC VALVE.

Application filed April 12, 1923. Serial No. 631,557.

*To all whom it may concern:*

Be it known that I, JAMES B. ANDERSON, a citizen of the United States, residing at Pittsburgh, in the county of Allegheny and State of Pennsylvania, have invented certain new and useful Improvements in Automatic Valves, of which the following is a specification.

This invention relates to valves and more especially to automatic valves operated by fluid pressure.

One of the main objects of this invention is to provide an automatic valve of simple and durable construction. Another object is to provide a valve having a head which is guided against rotation so as to engage the valve seat always in the same adjusted position. Still a further object is to provide a valve which does not require any subsequent adjustment and which can be manufactured at small cost.

Referring to the drawings,

Fig. 1 is a front elevation of the preferred form of valve of my invention.

Fig. 2 is a top view corresponding to Fig. 1.

Fig. 3 is a partial side elevation corresponding also to Fig. 1.

Fig. 4 is a side elevation showing the guides for the valve-head.

Fig. 5 is a top view of Fig. 4.

Fig. 6 is a side elevation of the valve-head.

Fig. 7 is a top view of Fig. 6.

Fig. 8 is a vertical cross-section taken substantially through the center of Fig. 1.

Fig. 9 is a vertical cross-section through a valve head made hollow to reduce its weight.

The valve, as shown in the drawings, is primarily intended for use in connection with the blow torches illustrated and described in Patents No. 1,390,264 and No. 1,390,265, dated September 13, 1921, issued to Charles H. Allen and myself. It is however understood that the same valve, or suitable modifications thereof, may be advantageously employed in connection with other devices using fluids under pressure.

Referring to the various figures, the valve, as now constructed, consists of a body 1 having at its lower end a shank 2 threaded to engage a correspondingly threaded pipe coupling attached to the end of a fuel supply hose, not shown in the drawings. This end is also used for securing a threaded cap which is applied after the fuel has been supplied to the container in order to prevent all possibilities of fuel leaks and to conform with underwriters rules. Such a cap is shown in Fig. 8 by numeral 15. Positioned above the shank 2 is a flange 3, preferably made polygonal, by means of which the threaded part 4 of the body is screwed into position on the fuel container. Surmounting part 4 is reduced and smooth shank 5 which is counterbored a required amount and partly planed or milled on opposite sides to form the concavo-convex guides 6 and 6$^a$, between which the cylindro-conical valve-head 7 is slidably mounted and guided against rotation upon its seat 16 by a pin 8 secured in the guides 6 and 6$^a$ and engaging a slot 9 cut diametrally across the upper, or flat part, of the valve-head. The valve-body 1 is provided with a central hole 10, of suitable diameter, which is terminated with the conical counterbore 16 to receive the conical end 11 of the valve-head.

The valve-head is preferably provided outwardly on its cylindrical portion with a circumferential groove 12 to minimize the possibilities of the valve-head binding against the concave sides of the guides 6 and 6$^a$. Another object of the groove is to prevent the collection and settling of dirt matter on the guides in that the sharp edges 13 and 14 of the groove will act as scrapers on the guides and thus remove the dirt therefrom.

The device is assembled by introducing the valve-head between the guides 6 and 6$^a$ and then securing the pin 8 in said guides, thereby preventing the escape and rotation of the valve-head. The depth of the slot 9, will, of course, determine the amount of travel of the valve-head away from its seat 16.

When the valve is to be used for fluid of relatively low pressure, its weight is preferably reduced to a minimum in order to enable its correct operation when in inverted position, that is, when the weight of the valve-head acts against the pressure of the fluid, thus tending to force the valve-head away from the seat. This reduction of weight, for a given material, is obtained by making the valve-head hollow, as shown in Fig. 9.

While I have illustrated and described herein the preferred embodiment of my invention, and one which I have found by actual use to be very practical, it may be thought desirable, after continued use, to make slight changes in the construction and arrangement of the details of my invention, and I intend to include in this application all such variations as fall within the scope of the appended claims.

What I claim is:

1. In an automatic valve of the character described, a valve-body; a valve-head of cylindro-conical shape; a plurality of guides formed integrally with the valve-body and partly engaging the circumference of said valve-head for guiding the longitudinal movements thereof, and means for simultaneously preventing the rotation of said valve-head and limiting the longitudinal movements thereof.

2. In an automatic valve of the character described, a valve-body; a valve-head of cylindro-conical shape; means positioned circumferentially of said valve-body for guiding the longitudinal movements of said valve-head; means for simultaneously preventing the rotation of said valve-head and limiting the longitudinal movement thereof, and means for removing deposits of dirt on said guides by the movements of said valve-head.

3. In an automatic valve of the character described, a valve-body; a valve-head of cylindro-conical shape; means positioned circumferentially of said valve-body for guiding the longitudinal movements of said valve-head; means for simultaneously preventing the rotation of said valve-head and limiting the longitudinal movements thereof, and means for removing deposits of dirt on said guide by the movements of the valve-head, said means being positioned on said valve-head.

4. In an automatic valve of the character described, a valve-body; a valve-head of cylindro-conical shape having a circumferential groove with sharp edges thereon; means positioned circumferentially of said valve-body for guiding the longitudinal movements of said valve-head and means for simultaneously preventing the rotation of said valve-head and limiting the longitudinal movements thereof.

5. In an automatic valve of the character described, a valve-body; a valve-head of cylindro-conical shape having a circumferential groove with sharp edges cut thereon; a pair of diametrally opposite guides formed integrally with the valve-body and partly engaging the circumference of said valve-head for guiding the longitudinal movements thereof; a slot positioned diametrally across the upper end of said valve-head, and a horizontal pin slidably engaged by said slot and secured in said guides.

6. In an automatic valve of the character described, a valve-body; a valve-head of cylindro-conical shape having a circumferential groove with sharp edges cut thereon; a pair of diametrally opposite guides formed integrally with the valve body and partly engaging the circumference of said valve-head for guiding the longitudinal movements thereof; a slot positioned diametrally across the upper end of said valve-head; a horizontal pin slidably engaged by said slot and secured in said guides, and means for reducing the weight of said valve-head.

7. In an automatic valve of the character described, a valve-body; a hollowed valve-head of cylindro-conical shape having a circumferential groove with sharp edges cut thereon; a pair of diametrally opposite guides formed integrally with the valve-body and partly engaging the circumference of said valve-head for guiding the longitudinal movements thereof; a slot positioned diametrally across the upper end of said valve head, and a pin slidably engaged by said slot and secured in said guides.

In testimony whereof I affix my signature.

JAMES B. ANDERSON.